United States Patent [19]

Tsuchiya et al.

[11] Patent Number: 5,021,877
[45] Date of Patent: Jun. 4, 1991

[54] OPTICAL IMAGE READING APPARATUS CAPABLE OF READING MULTI-COLORED ORIGINAL

[75] Inventors: Michio Tsuchiya; Shuji Otsuka; Takayuki Matsumoto, all of Nagoya; Eiichi Ohta, Handa; Hakudai Kondo, Nagoya; Suzuyo Murai, Nagoya; Kouzi Takeyama, Nagoya; Mutumi Otobe, Nagoya; Tetsuo Harano, Inazawa; Kouichi Mino, Kashiwa; Hiroya Inagaki, Suginami; Koji Matsumura, Kashiwa, all of Japan

[73] Assignees: Brother Kogyo Kabushiki Kaisha, Aichi; Nippon Telegraph Corporation, Tokyo, both of Japan

[21] Appl. No.: 260,281

[22] Filed: Oct. 20, 1988

[30] Foreign Application Priority Data

| Oct. 27, 1987 | [JP] | Japan | 62-271254 |
| Nov. 6, 1987 | [JP] | Japan | 62-170589 |
| Jan. 22, 1988 | [JP] | Japan | 63-13159 |
| Apr. 1, 1988 | [JP] | Japan | 63-45143 |
| Apr. 1, 1988 | [JP] | Japan | 63-81687 |

[51] Int. Cl.$^5$ ............................................. H04N 1/46
[52] U.S. Cl. ................................. 358/75; 358/448; 358/461; 358/474
[58] Field of Search .............. 358/293, 80, 75, 285, 358/447, 448, 464, 461, 475, 474; 382/58, 65, 67

[56] References Cited

U.S. PATENT DOCUMENTS

| 4,458,264 | 7/1984 | Tamura | 358/75 |
| 4,490,740 | 12/1984 | Moriguchi | 358/75 |
| 4,560,866 | 12/1985 | Takenouchi | 358/293 |
| 4,577,218 | 3/1986 | Kurata | 358/75 |
| 4,718,768 | 1/1988 | Houki | 358/75 |
| 4,748,680 | 5/1988 | Margolin | 382/65 |
| 4,812,900 | 3/1989 | Kadowaki | 358/75 |
| 4,831,458 | 5/1989 | Watanabe | 358/474 |
| 4,855,753 | 8/1989 | Ichikawa et al. | 358/80 |

FOREIGN PATENT DOCUMENTS

| 61-191168 | 8/1986 | Japan . |
| 1159401 | 7/1969 | United Kingdom . |
| 1483928 | 8/1977 | United Kingdom . |
| 1495299 | 12/1977 | United Kingdom . |
| 2109192 | 5/1983 | United Kingdom . |
| 2138244 | 10/1984 | United Kingdom . |

Primary Examiner—Edward L. Coles, Sr.
Assistant Examiner—Jerome Grant, II
Attorney, Agent, or Firm—Oliff & Berridge

[57] ABSTRACT

An optical image reading apparatus for photoelectrically reading images formed in at least two colors on a surface of an original having a base color different from the at least two colors, including a first reading device for obtaining a first image signal for each of a multiplicity of reading spots in a predetermined area on the original. The first image signal has two different levels one of which corresponds to the base color and the other of which corresponds to the at least two colors. The apparatus further includes a second reading device for obtaining a second image signal for the each reading spot. The second image signal cooperates with the first image signal to discriminate each of the at least two colors from the other of the at least two colors. Provisions are made for determining whether the levels of the first image signals for all of the multiplicity of reading spots are equal to the above-indicated one level corresponding to the base color, or not. If so, the second reading device is inhibited from operating to obtain the second inage signal for each reading spot.

16 Claims, 10 Drawing Sheets

OPTICAL IMAGE READING APPARATUS CAPABLE OF READING MULTI-COLORED ORIGINAL

BACKGROUND OF THE INVENTION

1. Field of the Invention

The present invention relates to an optical image reading apparatus, and more particularly to such an image reading apparatus capable of discriminating two or more colors of images from each other by irradiating reading spots on an original which bears the images.

2. Discussion of the Prior Art

An example of an optical image reading apparatus having a color discriminating function uses an optical reading head which has a plurality of yellow light-emitting elements LYn for producing yellow light beams, and a plurality of red light-emitting elements LRn for producing red light beams. The reading head has an image reading surface which extends along a platen on which an original bearing images to be read by the reading head is supported. The yellow light-emitting elements LYn are optically coupled to light-receiving ends of respective light-transmitting optical fibers Tn which are disposed such that their light-emitting ends are exposed on the image reading surface of the reading head. Similarly, the red light-emitting elements LRn are optically coupled to the light-receiving ends of the above-indicated light-transmitting optical fibers Tn which are disposed such that their light-emitting ends are exposed on the image reading surface. The light-emitting ends of the light-transmitting optical fibers are arranged in a straight row parallel to the platen, such that the light-emitting ends are equally spaced apart from each other.

The yellow light beams produced by the yellow light-emitting elements LYn and emitted from the light-transmitting optical fibers Tn toward the surface of the original are reflected by reading spots Sn on the surface, and the reflected yellow light beams are received by respective light-receiving optical fibers Rn whose light-receiving ends are located adjacent to the light-emitting ends of the respective light-transmitting optical fibers Tn. The yellow light beams received by the light-receiving optical fibers Rn are received by light-sensitive elements Pn. Similarly, the red light beams produced by the red light-emitting elements LRn and emitted from the light-transmitting optical fibers Tn are reflected by the reading spots Sn, and the reflected red light beams are also received by respective light-receiving optical fibers Rn and the light-sensitive elements Pn.

Initially, the line of reading spots Sn is irradiated with the yellow light beams. Output signals of the light-sensitive elements Pn are amplified by respective amplifiers An and applied to respective comparators Gn. Levels of the input signals of the comparators Gn are compared with predetermined reference or threshold values. Based on output signals of the comparators Gn, a suitable processing unit effects determination whether the reading spots Sn have a black or red color as distinguished from the base color (usually white) of the surface of the original. Namely, the irradiation of the reading spots Sn with the yellow light beams is effected to check each reading spot Sn for the presence of the black or red color. Then, the same line of reading spots Sn is irradiated with the red light beams, and output signals of the comparators Gn are obtained. Based on both the output signals of the comparators Gn upon irradiation of the reading spots Sn with the yellow light beams and the output signals of the same upon irradiation of the reading spots Sn with the red light beams, the processing unit determines whether the reading spot Sn which has been judged to have a black or red color as a result of the yellow beam irradiation is black or red.

Thus, each line of reading spots Sn is irradiated two times, one with the yellow light beams, and the other with the read light beams. In other words, the known optical image reading apparatus discussed above performs the second irradiation of the line of reading spots Sn with the red light, even if that line does not have any images (black and/or red dots). This leads to comparatively low image reading efficiency and economy.

As indicated above, the presence or absence of the black and red spots is determined based on the output signals of the comparators Gn when the reading spots Sn are irradiated with the yellow light beams. Further, the black and red spots are discriminated based on the output signals of the comparators Gn upon irradiation of the reading spots with the red light beams, in combination with the output signals upon the yellow beam irradiation. The original may have gray spots. In this case, the input level of the comparator Gn upon yellow beam irradiation of the gray spot may be either smaller or larger than the threshold value of the reference signal applied to the comparator Gn. When the input level of the comparator Gn upon the yellow beam irradiation is larger than the threshold value, the gray spot is judged to be white, irrespective of the input level of the comparator Gn upon the red beam irradiation of the gray spot. Since the gray spot is judged as a white spot, this does not practically cause a problem. However, if the input level of the comparator Gn upon the yellow beam irradiation is smaller than the reference value, the gray spot is judged to be either black or red, depending upon the input level of the comparator Gn upon the red beam irradiation. Where the input level is smaller than the reference value and the gray spot is judged to be black, the gray spot is printed as a black dot when the image data produced by the apparatus is used for printing. This may be tolerable since the printed document is just blurred by the black dot. However, the judgement of the gray spot as being red causes a problem, since the red dot in the non-imaged area of the printed document appears strange. Therefore, it is desirable to avoid the situation in which the input level of the comparator upon the red beam irradiation is larger than the threshold value when the input level of the comparator upon the yellow beam irradiation is smaller than the threshold value.

In the case where the original bears black images, the image reading by the reading head may be achieved by the yellow beam irradiation only. If corrections are inserted in red on the original, the red dots as well as the black dots are printed, when the image data produced by the apparatus is used for printing. Sometimes, however, it is desired that the original be printed without the red corrections. In this instance, it is required to reproduce the original without the red corrections, which requires extra time and cost.

SUMMARY OF THE INVENTION

It is accordingly a first object of the present invention to provide an optical image reading apparatus which is capable of reading images formed in two or more colors, with improved reading efficiency.

It is a second object of the invention to provide such an optical image reading apparatus which has provisions for avoiding erroneous determination of a specific color.

A third object of the invention is to provide such an optical image reading apparatus which is capable of ignoring an image of a specific color or determining the specific color as a base color of the surface of an original on which images to be read are formed.

The first object may be achieved according to the principle of the present invention, which provides an optical image reading apparatus for photoelectrically reading images formed in at least two colors on a surface of an original having a base color different from the at least two colors, comprising: (a) first reading means for obtaining a first image signal for each of a multiplicity of reading spots in a predetermined area on the original, the first image signal having two different levels one of which corresponds to the base color and the other of which corresponds to the at least two colors; (b) second reading means for obtaining a second image signal for each reading spot, the second image signal cooperating with the first image signal to discriminate each of the at least two colors from the other of the at least two colors; and (c) omitting means for determining whether the levels of the first image signals for all of the multiplicity of reading spots are equal to the above-indicated one level corresponding to the base color, or not. If the levels of the first image signals for all the reading spots are equal to that of the base color, the omitting means inhibits the second reading means from operating to obtain the second image signals for the reading spots.

In the image reading apparatus of the present invention constructed as described above, the reading spots in the predetermined area along a straight line on the original is irradiated first by the first reading means, in order to determine the imaged spots as distinguished from the non-imaged spots or blank portion (usually white). Then, the same predetermined area is irradiated by the second reading means. The colors of the imaged spots are determined based on the first image signal obtained by the first reading means, and the second image signal obtained by the second reading means. However, if the first image signals for all the reading spots in the predetermined area indicate that the predetermined area has no imaged spots, i.e., no images in a color or colors different from the base color of the original, then the irradiation by the second reading means is omitted to save time otherwise spent in conducting the second irradiation of the reading spots by the second reading means. Thus, the instant image reading apparatus assures an efficient and economical image reading operation.

In one form of the present invention, the first reading means and the second reading means may respectively utilize first light source means for emitting first light beams having a first wavelength for distinguishing the above-indicated at least two colors of the images from the base color, and second light source means for emitting second light beams having at least one second wavelength different from the first wavelength of the first light beams. In this case, the first and second reading means further include image-reading irradiation means, photoelectric detecting means and color discriminating means, and the omitting means consists of irradiation omitting means. The image-reading irradiation means is adapted to irradiate predetermined reading spots in a predetermined area of the surface of the original with the first and second light beams, at different times, for reading the images in the predetermined area. The photoelectric detecting means is adapted to generate output signals indicative of optical intensities of the first and second light beams which have been optically influenced by the colors in the reading spots. The color discriminating means determines the colors of the images in the reading spots, based on the output signals from the photoelectric detecting means. The irradiation omitting means is adapted to determine, based on the output signals indicative of the optical intensities of the optically influenced first light beams, whether the color discriminating means has recognized an absence of any colors other than the base color in the predetermined area, or not. If the irradiation omitting means determines that the color discriminating means has recognized the absence of any colors other than the base color, then the irradiation omitting means inhibits the second light source means from emitting the second light beams.

The second object of the invention may be attained according to one advantageous feature of the above form of the invention, wherein at least one of an intensity of the second light beams and an amplification constant of the photoelectric detecting means with respect to the output signals indicative of the optical intensities of the optically influenced second light beams is adapted to be smaller than corresponding at least one of an intensity of the first light beams and an amplification constant of the photoelectric detecting means with respect to the output signals indicative of the optical intensities of the optically influenced first light beams.

The above feature of the invention prevents erroneous determination of a color, more precisely, erroneous determination of an intermediate color or neutral tint such as gray. This aspect of the reading operation will be described in greater detail. Where yellow and red light beams are used as the first and second light beams, respectively, to read black and red images (consisting of black and red spots) on a white surface of an original which includes gray spots, the presence of the black and red spots is determined based on the output signals that are generated by the detecting means when the reading spots are irradiated with the yellow light beams. Further, the black and red dots are discriminated based on the output signals generated by the detecting means upon irradiation of the reading spots with the red light beams, in combination with the output signals upon the yellow beam irradiation. If a reading spot is gray, the input level of the detecting means upon irradiation of the gray spot with the yellow light beam may be either smaller or larger than a reference or threshold value which is also applied to the detecting means to produce its output signal. When the input level of the detecting means upon the yellow beam irradiation is larger than the reference value, the gray spot is judged to be white, irrespective of the input level of the detecting means upon irradiation of the gray spot with the red light beam. Since the gray spot is judged as a white spot, this does not cause a problem. However, if the input level of the detecting means upon the yellow beam irradiation is smaller than the reference value, the gray spot is judged to be either black or red, depending upon the input level of the detecting means upon the red beam irradiation. Where the gray spot is judged to be black, the gray spot is printed as a black dot when the image data as read by the instant apparatus is used for printing. This may be acceptable since the printed document is just blurred by the black dot. However, the judgement of the gray spot as being red causes a problem, since the red dot in the non-imaged area of the printed document appears strange. Therefore, it is desirable to avoid the situation in which the input level of the detecting means upon the red beam irradiation is larger than the reference value when the input level of the detecting means upon the yellow beam irradiation is smaller than the reference value. Namely, it is required that the intensity of the red light beam emitted by the second light source means be set lower than that of the yellow light beam emitted by the first light source means, or it is required that the amplification constant of the detecting means upon the red beam irradiation be lower than that upon the yellow beam irradiation.

According to one arrangement of the above feature of the invention, the apparatus further comprises a light reflecting surface having a reference reflectance of light, preliminary irradiation means for irradiating test spots on the light reflecting surface with the first and second light beams, at different times, and adjusting means for adjusting the intensities of the first and second light beams emitted by the first and second light source means, and/or the amplification constants of the photoelectric detecting means, so that a level of the output signals of the detecting means for the first and second light beams is equal to a predetermined level while the preliminary irradiation means is operating. In this case, the apparatus further comprises memory means for storing the adjusted intensity of the optically influenced first and second light beams, and/or the adjusted amplification constants, and sensitivity lowering means for setting the amount of the second light beams emitted by the second light source means, and/or the amplification constant of the photoelectric detecting means for the optically influenced second light beams, at a value lower than that stored in the memory means. Accordingly, at least one of the intensity of the second light beams and the amplification constant of the photoelectric detecting means with respect to the output signals indicative of the optical intensities of the optically influenced second light beams is set smaller than the corresponding at least one of the amount of the first light beams and the amplification constant of the photoelectric detecting means with respect to the output signals indicative of the optical intensities of the optically influenced first light beams. In this case, a variation in the level of the input signal applied to the detecting means upon irradiation of the reading spot (such as a gray spot) with the second light beam will not cause the color discriminating means to undesirably determine the color of the reading spot to be a comparatively less frequently used color such as red (as compared with black).

The second object may also be achieved according to another advantageous feature of the above-indicated form of the invention, wherein the photoelectric detecting means comprises light-sensitive elements for receiving the optically influenced first and second light beams, and generating optical intensity signals corresponding to the intensities of the optically influenced first and second light beams, and comparator means for comparing levels of the optical intensity signals from the light-sensitive elements with a threshold level of a reference signal, and producing as the output signals of the photoelectric detecting means signals having two different levels, depending upon whether the levels of the optical intensity signals are higher than the threshold level, or not. In this instance, the detecting means further comprises threshold adjusting means for changing the threshold level of the reference signal while the second light source means is operating, from that while the first light source means is operating. This feature of the invention provides an effect similar to that provided according to the above feature of the invention.

The third object of the invention may be accomplished according to a further advantageous feature of the invention, wherein the image reading apparatus further comprises selector means for activating the second light source to emit the second light beams having a selected one of the above-indicated at least one second wavelength, without activating the first light source. Suppose an original bears images which consist of statements written in black on a white base, and some corrections inserted in red. If only the first light beams, for example, yellow light beams are emitted to irradiate the reading spots, both the black statements and the red corrections are determined as black images. However, if it is desired to copy the original without printing of the inserted corrections, only red light beams as the second light beams are emitted to irradiate the reading spots. Since the intensity of the red light beams which are reflected by the red spots is almost equal to that of the red light beams which are reflected by the white base surface, the red spots are determined to white. Consequently, the red corrections will not appear in a printed document prepared according to the image data prepared by the image reading apparatus which has the selector means according to the present feature.

According to a still further feature of the invention, the image reading irradiation means comprises (a) a platen for supporting the original, (b) a reading head having a plurality of first light emitting portions optically coupled to the first light source means, and a plurality of second light emitting portions optically coupled to the second light source means, the first and second light emitting portions being disposed alternately such that the reading spots irradiated by the first and second light beams are arranged along a straight line, and such that the first light emitting portions are spaced apart from each other by a predetermined first distance while the second light emitting portions are spaced apart from each other by the predetermined first distance, a pitch at which the reading spots are arranged being smaller than the predetermined first distance; (c) a head feeding device for moving the reading head along the straight line, in increments of a predetermined second distance corresponding to the pitch; and (d) light source control means for activating the first and second light source means upon each incremental movement of the reading head by the predetermined second distance.

According to a yet further feature of the invention, the first light source means includes a plurality of first light emitting elements for generating the first light beams, and a plurality of first light-transmitting optical fibers optically coupled to the first light-emitting elements, respectively, for transmitting the first light beams, and the second light source means includes a plurality of second light-emitting elements for generating the second light beams, and a plurality of second light-transmitting optical fibers optically coupled to the second light-emitting elements, respectively, for transmitting the second light beams. Ends of the first optical fibers remote from the first light-emitting elements are spaced apart from each other by a predetermined distance along a straight line, while ends of the second optical fibers are disposed between the ends of the adjacent first optical fibers such that the second light beams emitted from the ends of the second optical fibers do not interfere with the first light beams emitted from the ends of the first optical fibers. This arrangement is advantageous over the known arrangement wherein a single light-transmitting optical fiber is optically coupled to two or more light-emitting elements which emit light beams having different wavelengths corresponding to different colors such as yellow and red. Namely, substantially entire amount of the light beam emitted by a light-emitting element may be incident upon the corresponding light-transmitting optical fiber, whereby the image reading reliability is improved.

According to another aspect of the present invention, there is provided an optical image reading apparatus for photoelectrically reading images formed in at least two colors on a surface of an original having a base color different from the at least two colors, comprising first reading means and second reading means. The first reading means is adapted to obtain a first image signal for each of a multiplicity of reading spots in a predetermined area on the original. The first image signal has two different levels one of which corresponds to the base color and the other of which corresponds to the at least two colors. The second reading means is adapted to obtain a second image signal for each reading spot, the second image signal cooperating with the first image signal to discriminate each of the above-indicated at least two colors from the other of the at least two colors. The second reading means has a lower optical sensitivity than the first reading means. Namely, the lower limit of the intensity of a light beam to which the second reading means is sensitive to produce an output signal indicative of the reception of the light beam is higher than that to which the first reading means is sensitive.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
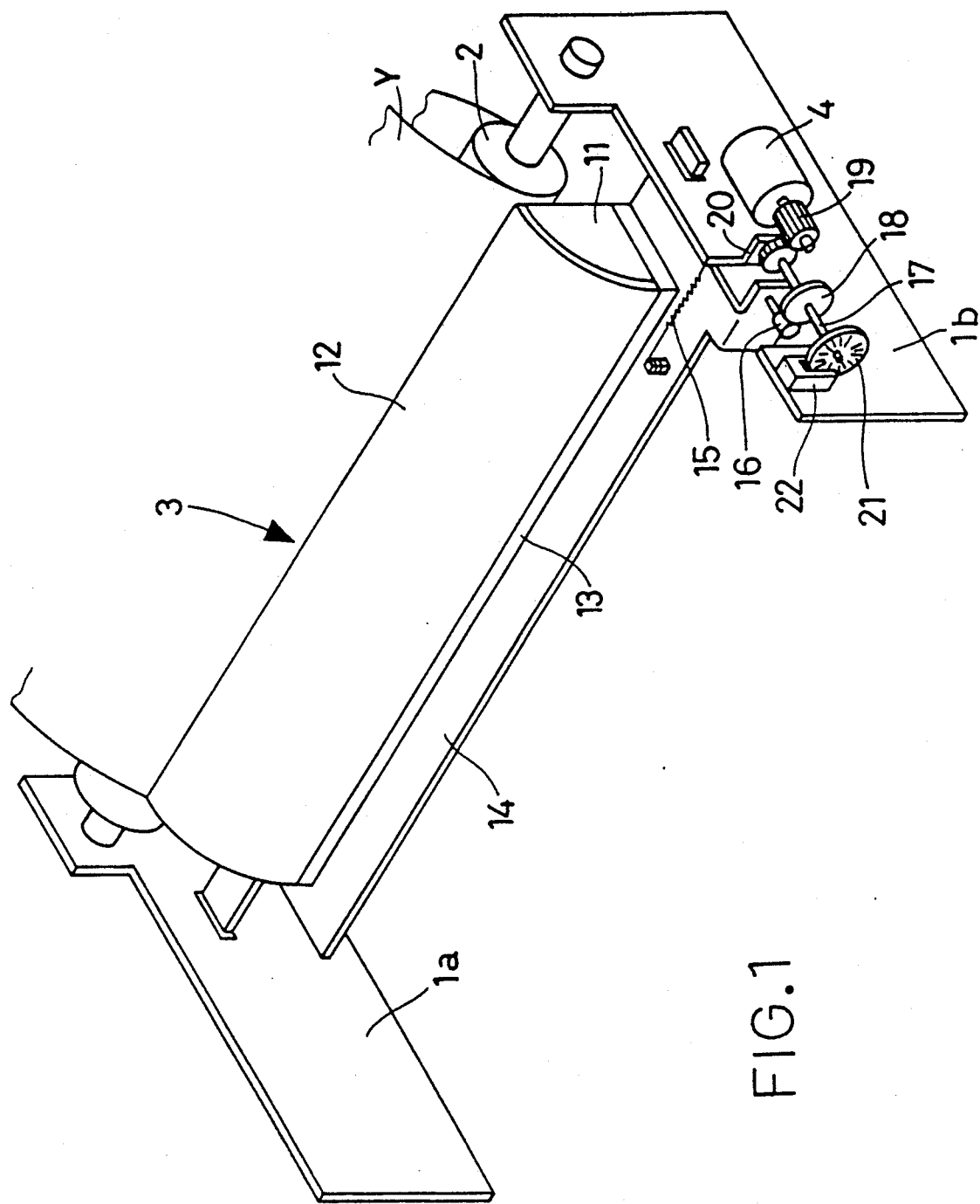
FIG. 1 is a perspective view of one embodiment of an optical image reading apparatus of the present invention.

Referring first to the perspective view of FIG. 1, the optical image reading apparatus has a left and a right frame 1a, 1b, which rotatably supports a platen in the form of a roller 2 for supporting an original Y which bears images to be read. The frames 1a, 1b also support a head-support plate 14 such that the head-support plate 14 is slidably reciprocated along the platen 2. A shuttle type optical reading head 3 is mounted on the head-support plate 14 in opposed relation with the circumferential surface of the platen 2.

The head-support plate 14 is biased by a spring 15 in one of opposite directions parallel to the platen 2, toward the right frame 1b, which rotatably supports a shaft 17 to which an eccentric peripheral cam 18 is secured. Under a biasing force of the spring 15, the periphery of the peripheral cam 18 is held in pressed rolling contact with a cam follower 16 fixed to the head-support plate 14. The shaft 17 is rotated by a head reciprocating motor 4, through a first gear 19 mounted on the output shaft of the motor 4 and a second gear 20 fixed to the shaft 17. A rotary movement of the shaft 17 is detected by a rotary encoder which includes a rotary disk 21 mounted on the shaft 17, and a photoelectric sensor 22 fixed to the frame 1b. The rotary disk 21 has a multiplicity of radial slits, and is positioned such that the slits of the disk 21 pass a light path between a light-emitting element and a light-receiving element of the photoelectric sensor 22.

With the head reciprocating motor 4 operated, the eccentric peripheral cam 18 is rotated with the shaft 17, whereby the shuttle type reading head 3 mounted on the head-support plate 14 with the cam follower 16 in rolling contact with the cam 18 is moved against the biasing force of the spring 15 in the direction from the right frame 1b toward the left frame 1a, while the peripheral cam 18 is rotated by a given angle. Subsequently, the cam 18 permits the reading head 3 to be moved in the reverse direction under the biasing action of the spring 15. Thus, the reading head 3 is reciprocated along the platen 2. During the reciprocating movements of the reading head 3, the photoelectric sensor 22 produces a timing signal when each of the slits of the disk 21 passes the photoelectric sensor 22 during rotation of the disk 21. The timing signals represent the positions of the reading head 3 at which the head 3 effects reading operations, as described below.

Figure 2:
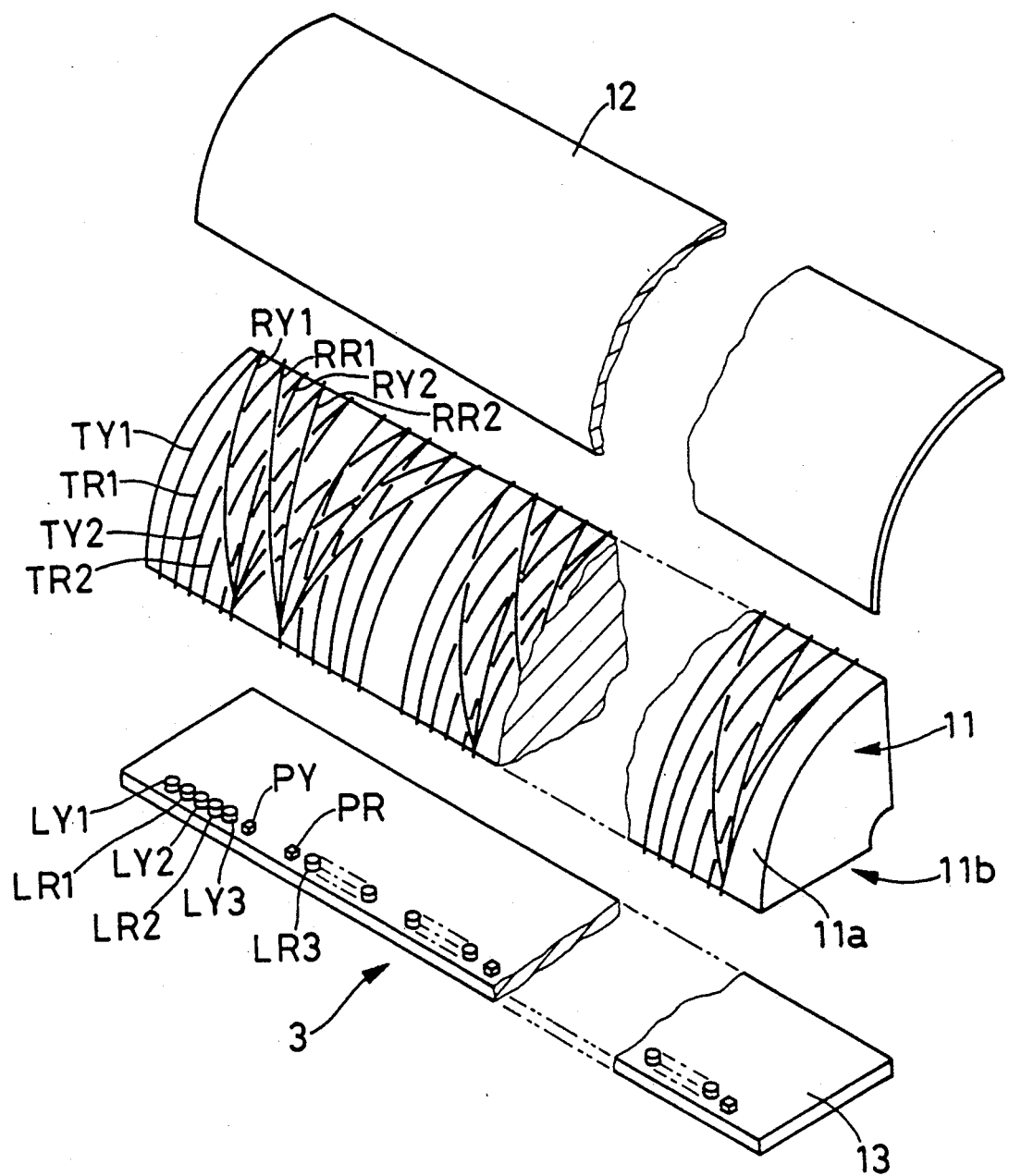
FIG. 2 is an exploded view in perspective of an optical reading head of the apparatus of FIG. 1.

The construction of the optical reading head 3 is shown in detail in the exploded perspective view of FIG. 2 wherein the head 3 comprises a body 11 which has a generally sectorial shape, more specifically, a substantially quadrant shape in transverse cross section. The body 11 has a substantially arcuate surface 11a which serves as a support for a group of yellow light-transmitting optical fibers TY1, Ty2, ... TYn for transmitting yellow light beams emitted from yellow light-emitting elements LY1, LY2, ... LYn, and a group of red light-transmitting optical fibers TR1, TR2, ... TRn for transmitting red light beams emitted from red light-emitting elements LR1, LR2, ... LRn. The yellow and red light beams have different wavelengths which correspond to yellow and red colors. The lower ends (as seen in FIG. 2) of the yellow and red light-transmitting optical fibers TYn and TRn are optically coupled to the yellow and red light-emitting elements LYn, LRn, respectively. The yellow and red optical fibers TYn and TRn are disposed alternately and in equally spaced-apart relation with each other. Further, the arcuate surface 11a supports a group of yellow light-receiving optical fibers RY1, RY2, ... RYn which correspond to the yellow light-transmitting optical fibers TYn, and a group of red light-receiving optical fibers RR1, RR2, ... RRn which correspond to the red light-transmitting optical fibers TRn. The upper ends (as seen in FIG. 2) of the light-receiving optical fibers RYn and RRn are positioned adjacent to the upper ends of the corresponding light-transmitting optical fibers TYn and TRn. However, the lower ends of a predetermined number of the yellow light-receiving optical fibers RYn are optically coupled to a corresponding one of a plurality of yellow light-sensitive elements PY1, PY2, ... PYn. Similarly, the lower ends of a predetermined number of the red light-receiving optical fibers RRn are optically coupled to a corresponding one of a plurality of red light-sensitive elements PR, PR2, ... PRn. The light-transmitting and light-receiving optical fibers TYn, TRn, RYn, RRn thus supported on the arcuate surface 11a are covered by a covering member 12. The yellow and red light-emitting elements LYn, LRn and the yellow and red light-sensitive elements PYn, PRn are disposed on a printed-circuit board 13 bonded to a lower surface 11b of the body 11.

Figures 3, 5:
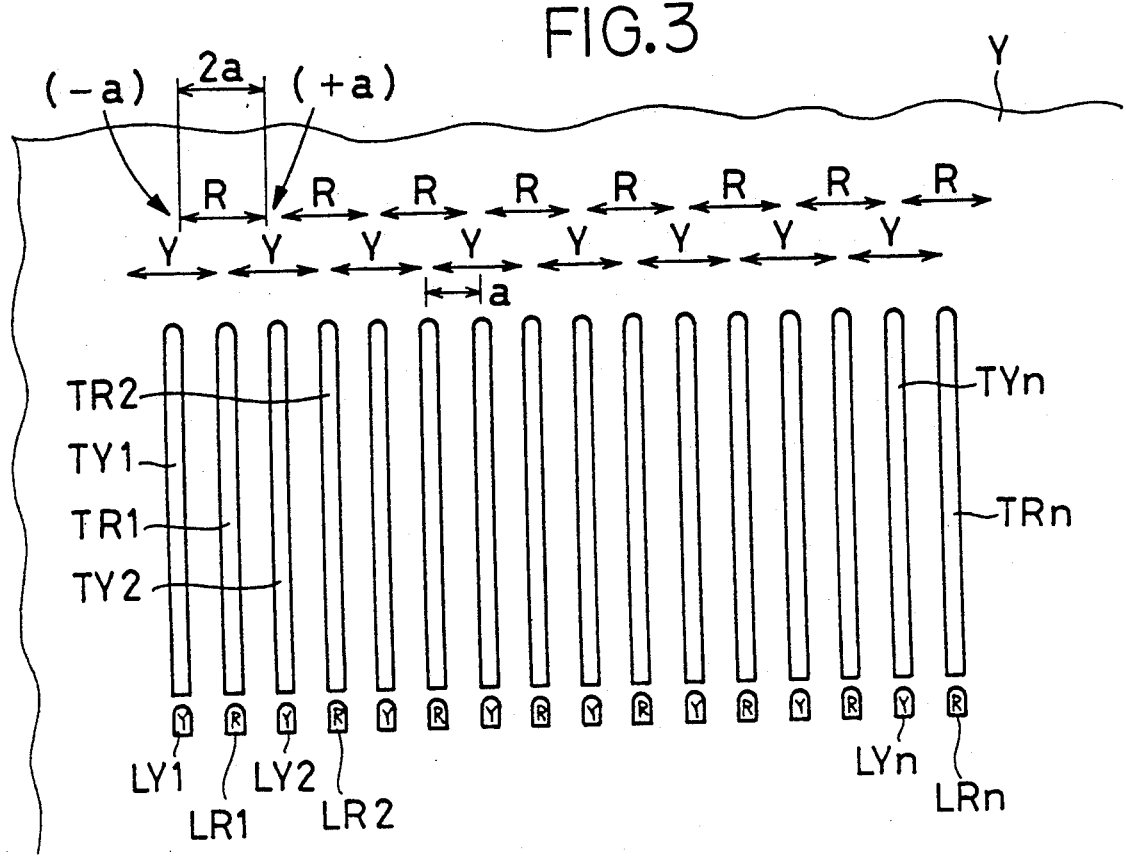
FIG. 3 is a view explaining an operation of the optical reading head.
FIG. 5 is a truth table used by a data processing circuit to determine the colors of images to be read.

It will be understood that a distance of movement of the reading head 3 along the axis of the platen 2 by rotation of the eccentric peripheral cam 18 is two times an amount of eccentricity of the cam 18, i.e., 2a, where "a" represents the eccentricity, as indicated in FIG. 3. Namely, the reading head 3 is moved from a point (−a) via a point (0) to a point (+a). FIG. 3 shows a condition in which the reading head 3 is placed at the middle point of its movement. The number and the positions of the slits provided on the rotary disk 21 are so determined that the timing signals produced by the photoelectric sensor 22 correspond to a predetermined number and positions of reading points (reading spots) which divide the distance 2a between the points (−a) and (+a) into equal parts. In the present embodiment, the reading operation occurs at the point (−a) but does not occur at the point (+a).

Figure 4:
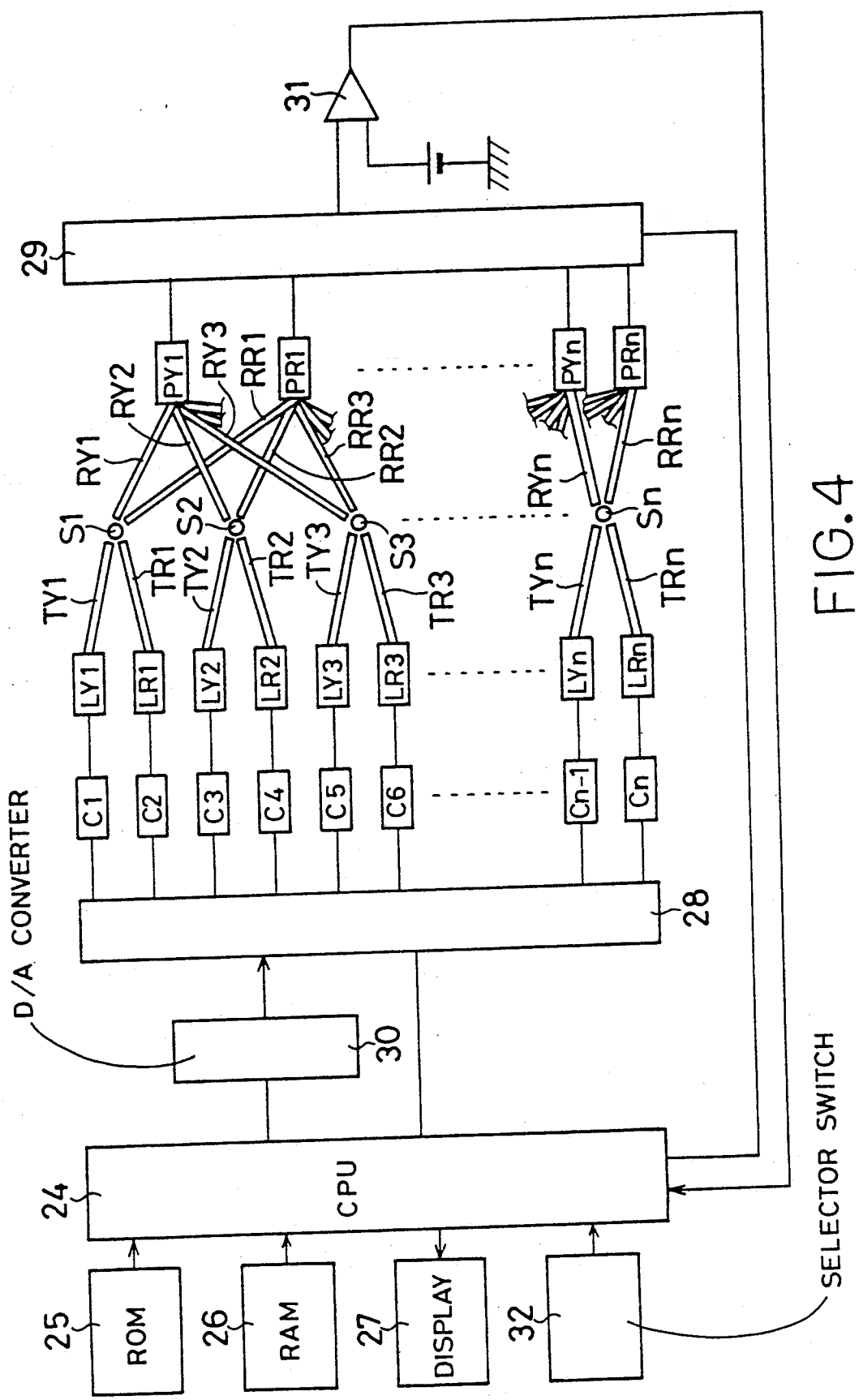
FIG. 4 is a schematic block diagram showing an electric control system for controlling the reading head of the apparatus of FIG. 1.

Referring to FIG. 4, there is shown a control system for controlling the reading head 3 which includes a CPU 24, and a ROM 25 and a RAM 26 which are connected to the CPU 24. The ROM 25 stores various control programs including a truth table as indicated in FIG. 5, a program to execute an image reading routine as illustrated in the flow chart of FIG. 6, and a program to execute a light-intensity adjusting routine as illustrated in FIG. 7. The CPU 24 cooperates with the ROM 25 and RAM 26 to control a display 27, and a first and a second multi-plexer 28, 29. The first multiplexor 28 is connected to a multiplicity of driver circuits Cn which are connected to the yellow and red light-emitting elements LYn and LRn. The CPU 24 applies intensity signals to the driver circuits Cn through a D/A converter and the first multiplexor 28, as described later in detail. The light-sensitive elements PYn, PRn optically coupled to the light-receiving optical fibers RYn, RRn are connected to the second multiplexor 29, so that the output signals of the light-sensitive elements PYn, PRn are sequentially applied to a color discriminating element in the form of a voltage comparator 31. This comparator 31 is connected to the CPU 24.

When the reading head 3 reaches each reading point or spot during its movement in one of the opposite directions (e.g., in the leftward direction), the yellow light-emitting elements LY1–LY5 are activated sequentially in this order to emit yellow light beams from the corresponding yellow light-transmitting optical fibers TYn, under the control of the CPU 24, whereby the corresponding reading spots along a line on the original Y are irradiated by the yellow light beams. Thus, the reading operation of one line of images by the yellow light beams is completed during the movement of the reading head 3 in one direction, since the number of the light-transmitting optical fibers TYn is determined so that the reading spots cover the length of the line to be read.

Similarly, the red light-emitting elements LRn are activated when the reading head 3 reaches each reading point during its movement in the other direction (e.g., in the rightward direction), under the control of the CPU 24. Consequently, the corresponding reading spots along the same line on the original Y are irradiated by the red light beams emitted from the red light-transmitting optical fibers TRn. As indicated in FIG. 3, the yellow reading points (−a) and (0) correspond to the red reading points (0) and (+a), for example.

The yellow and red light beams emitted from the optical fibers TYn, TRn are reflected by the predetermined reading spots along a straight line on the original Y. The intensity of the reflected light beam varies depending upon the presence and absence of the images, and depending upon the color of the images. The intensities of the reflected light beams are represented by the output signals generated from the yellow and red light-sensitive elements PYn, PRn. These output signals are processed by the voltage comparator 31.

In the instant optical image reading apparatus, the yellow and red light beams are used to distinguish non-imaged areas (white images) from black and red images, and to distinguish the black and red images from each other, as described below.

The determination of the colors (white, black and red) of the reading spots by the voltage comparator 31 is accomplished according to a truth table indicated in FIG. 5. Described more specifically referring to the flow chart of FIG. 6, when the output of the comparator 31 upon irradiation of the reading spot Sn by the yellow light beam emitted by the yellow light-sensitive element PYn is "0", the comparator 31 determines that the color of the appropriate reading spot Sn (FIG. 4) is white irrespective of whether the output of the comparator 31 upon irradiation of the reading spot Sn with the red light beam emitted by the red light-sensitive element PRn is "0" or "1". Therefore, the irradiation with the yellow light beams as indicated at S1 in the flow chart is effected for determining whether there exists an image (black or red image) in the appropriate reading spot Sn. Then, the irradiation of the reading spots Sn with the red light beams is effected as indicated at S3 by activating the red light-emitting elements LRn while the reading head 3 is moved in the reverse direction.

Figure 6:
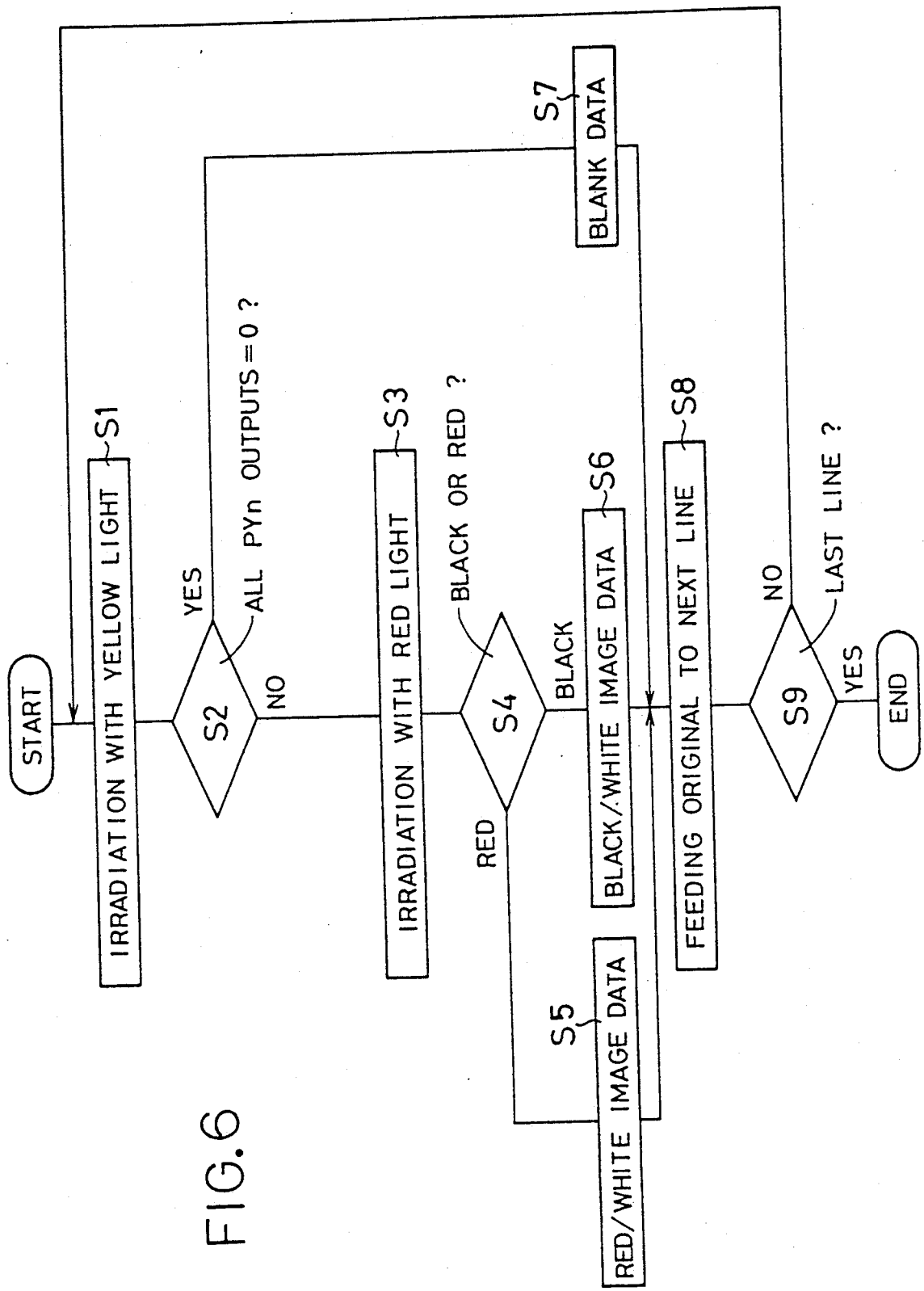
FIG. 6 is a flow chart illustrating an image reading operation in the apparatus of FIG. 1.
Figure 7:
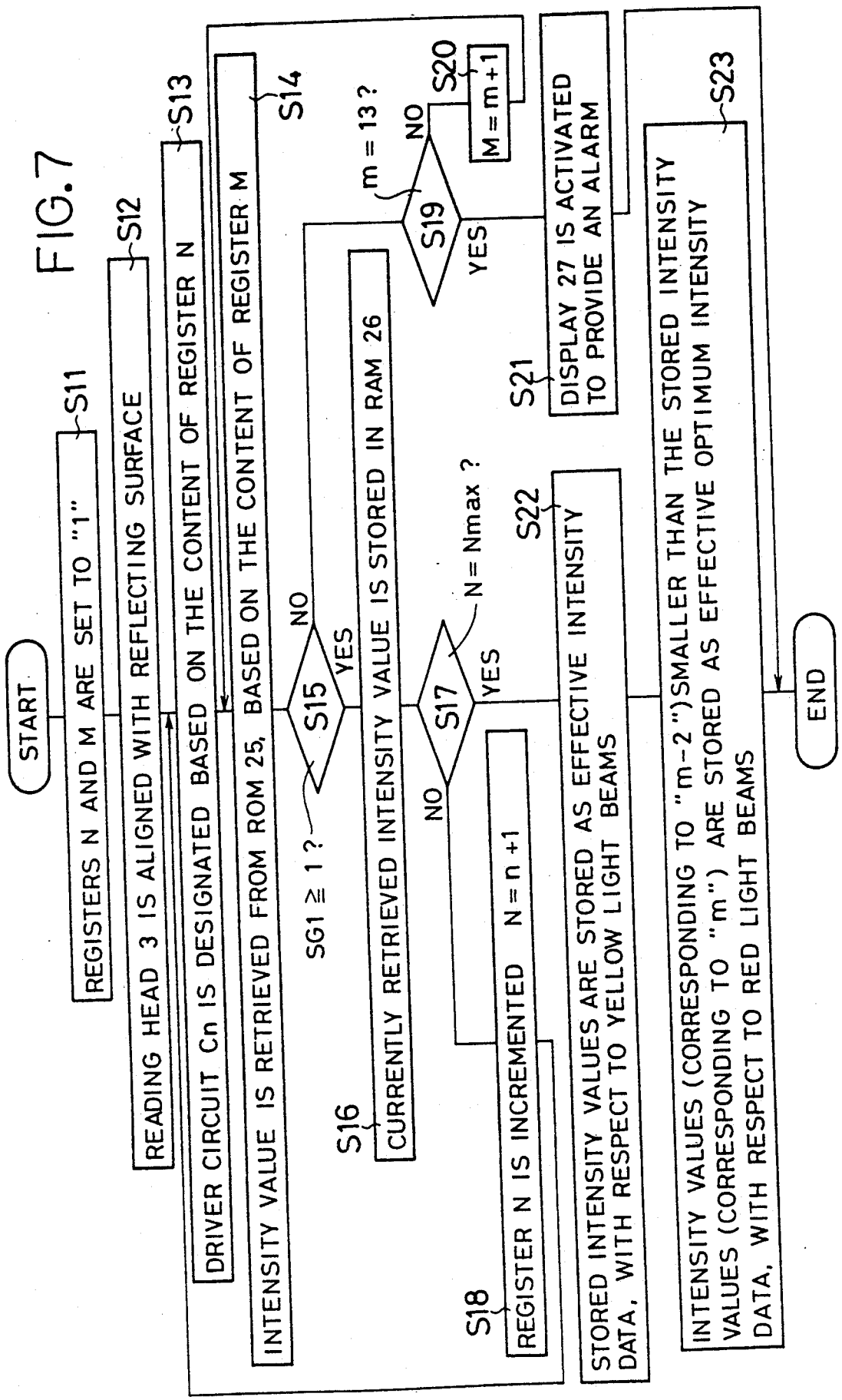
FIG. 7 is a flow chart illustrating a light-intensity adjusting routine for the reading head of the apparatus of FIG. 1.

For the reading spots Sn whose color is determined to be red or black based on the output "1" of the comparator 31 upon irradiation of the reading spots Sn with the yellow light beams, the CPU 24 determines whether the outputs of the comparator 31 upon irradiation of those reading spots Sn are "0" or "1", as indicated at S4 in the flow chart of FIG. 6. If the output of the comparator 31 is "0", the color of the image in the appropriate reading spot Sn is judged to be red, and red/white image data is prepared by the CPU 24, as indicated at S5. If the output of the comparator 31 is "1", the color of that image is judged to be black, and black/white image data is prepared by the CPU 24, as indicated at S6.

If all of the outputs of the comparator 31 upon irradiation of the reading spots Sn with the yellow light beams emitted by the yellow light-sensitive elements PYn are "0", i.e., if none of the reading spots Sn along the line in question have any black or red images, the irradiation of the reading spots Sn with the red light beams is omitted, and non-image or blank data is prepared by the CPU 24, as indicated at S2 and S7 in FIG. 6. In this case, the platen 2 is rotated to advance the original Y to the next line. Unless the previous line is the last line of the original Y, the irradiation with the yellow light beams is effected to read the above-indicated next line, as indicated at S9 and S1. In this case, the irradiation with the yellow light beams occurs while the reading head 3 is moved in the reverse direction. Namely, irrespective of the direction of movements of the reading head 3, the irradiation with the yellow light beams (emitted by the yellow light-emitting elements LYn) is performed to determine whether images (black and red images) are present in the reading spots, while the irradiation with the red light beams (emitted by the red light-emitting elements LRn) is performed to discriminate the black and red images from each other. If the relevant line does not include any black or red images, the irradiation with the red light beams is omitted to speed up the image reading operation.

As described above, the CPU 24 effects the determination in step S4 of FIG. 6, based on whether the output of the comparator 31 is "0" or "1". More specifically, the output level of the comparator 31 is determined by the output level of the light-sensitive element PYn, PRn applied as an input to the comparator 31, as compared with a reference or threshold value (reference voltage) applied as another input to the comparator 31. Therefore, the truth table of FIG. 5 is expressed as the following truth table which is based on the levels of the output signals of the light-sensitive elements PYn, PRn as compared with the reference values for the yellow and red light beams:

|  |  | Output Level of PYn | |
|---|---|---|---|
|  |  | SMALLER | LARGER |
| Output Level of PRn | SMALLER | Black | White |
|  | LARGER | Red | White |

In the table, "SMALLER" means that the output level of the light-sensitive element PYn, PRn received by the comparator 31 is smaller than the reference or threshold value, while "LARGER" means that the above-indicated output level is larger than the reference value.

Where the surface of the original Y is gray, the output level of the yellow light-sensitive element PYn may be either smaller or larger than the reference value. When the output of the element PYn is larger than the reference value, the color of the reading spot in question is judged to be white, irrespective of the level of the red light-sensitive element PRn. Since the gray spot is judged as a white spot, this does not practically matter. However, if the output of the element PYn is smaller than the reference value, the gray spot is judged to be either black or red depending upon the level of the red light-sensitive element PRn. Where the gray spot is judged to be black, the gray spot is printed as a black dot when the black data prepared by the CPU 24 is used as printing data. This is more or less acceptable since the printed document is simply blurred by the black dot. However, the judgement of the gray spot to be red causes a problem, since the red dot in the non-imaged area of a document appears strange. For this reason, it is desirable to avoid the situation where the output of the red light-sensitive element PRn is larger than the reference value when the output of the yellow light-sensitive element PYn is smaller than the reference value, where the gray spot is irradiated with the yellow and red light beams. In other words, it is desirable that the intensity of the red light beam emitted by the red light-emitting element LRn be set lower than that of the yellow light beam emitted by the yellow light-emitting element LYn.

To achieve the above requirement, the control system of the reading head 3 of the instant embodiment is adapted to operate in the manner as described below.

The ROM 25 stores data representative of thirteen different values of intensity of a light beam to be emitted by the light-emitting elements LYn, LRn. The CPU 24 selects one of the intensity value for each light-emitting element as described below. The output signals of the D/A converter 30 are applied to the first multiplexor 28, which sequentially applies the corresponding signals to the driver circuits Cn, in a time sharing manner, whereby the yellow light-emitting elements LYn (red light-emitting elements LRn) are sequentially activated.

By reference to the flow chart of FIG. 7, there will be described a light-intensity adjusting routine in which the intensity level of the light beam to be emitted by each light-emitting element LYn, LRn is selected or determined, prior to the image reading operation by the reading head 3.

Initially, the control flow goes to step S11 to initialize both of a register N and a register M (incorporated in the CPU 24) to "1". The register N is used to sequentially designate the light-emitting elements LYn, LRn, while the register M is used to designate one of thirteen intensity values of the light beam which is generated by the designated element LYn, LRn. Step S11 is followed by step S12 wherein the reading head 3 is aligned with a light reflecting surface which has a predetermined reference reflectance of light. The reflecting surface is provided on a suitable member which extends parallel to the platen 2, when placed in its operative position. Then, the control flow goes to step S13 wherein the CPU 24 selects the currently designated n-th driver circuit Cn based on the content of the register N, and then to step S14 wherein the CPU 24 retrieves the currently designated m-th intensity value from the ROM 25, and applies the corresponding intensity signal to the designated driver circuit Cn through the D/A converter 30. The control flow then goes to step S15 to check if the output level "SG" of the comparator 31 is equal to or larger than a reference value "1", or not. If an affirmative decision (YES) is obtained in step S15, the CPU 24 stores the currently selected m-th intensity value in memory means in the form of the RAM 26, as optimum intensity data for the n-th driver circuit Cn. The control flow then goes to step S17 to check if the content of the register N is equal to "Nmax" which is the total number of the light-emitting elements LYn, LRn (driver circuits Cn). If a negative decision (NO) is obtained in step S17, step S18 is executed to increment the content "n" of the register N, and step S13 is repeated to designate the next driver circuit Cn, based on the updated content (n+1) of the register N. Then, steps S14-S17 are repeated. Steps S18 and S13-S17 are repeated until an affirmative decision (YES) is obtained in step S17, that is, until the content of the register N reaches "Nmax" (total number of the light-emitting elements LYn, LRn).

As indicated above, the currently designated m-th intensity value is stored in the RAM 26 as the optimum intensity data for the currently designated n-th driver circuit Cn (for the n-th light-emitting element PYn, PRn) if the output level "SG" of the comparator 31 is equal to or larger than the predetermined reference value. If a negative decision (NO) is obtained in step S15, the control flow goes to step S19 to check if the content "m" of the register M is equal to "13" (indicating the number of the intensity values stored in the ROM 25), or not. If a negative decision (NO) is obtained in step S19, step S20 is executed to increment the content "m" of the register M, and step S14 is repeated to retrieve the next intensity value from the ROM 25, based on the updated content "m+1" of the register M. Thus, steps S15, S19, S20 and S14 are repeated until the output level "SG" of the comparator 31 coincides with the reference value "1", namely, until the optimum intensity value for the currently designated driver circuit Cn is found. If an affirmative decision (YES) is obtained in step S19, that is, if the optimum intensity value cannot be found, step S21 is implemented to activate the display 27, to indicate that there exists an intensity adjusting error.

After the optimum intensity data for all of the driver circuits Cn have been stored in the RAM 26, that is, when an affirmative decision (YES) is obtained in step S17, the control flow goes to step S22 in which the detected optimum intensity values stored in the RAM 26 are finally stored as effective optimum intensity data, with respect to the driver circuits Cn for the yellow light-emitting elements LYn (for the yellow light beams). Then, the control flow goes to step S23 wherein intensity values (corresponding to "m-2") which are two steps smaller than the stored intensity values (corresponding to "m") are finally stored in the RAM 26 as effective optimum intensity data, with respect to the driver circuits Cn for the red light-emitting elements LRn (for the red light beams).

According to the light-intensity adjusting routine as described above wherein the intensities of the red light beams emitted by the red light-emitting elements LRn are set lower than those of the yellow light beams emitted by the yellow light-emitting elements LYn, it is possible to avoid the previously indicated undesirable situation in which the output of the red light-sensitive element PRn is larger than the reference value when the output of the yellow light-sensitive element PYn is smaller than the reference value, where a gray spot is irradiated with the yellow and red light beams. Consequently, the instant arrangement makes it possible to avoid printing the gray spot as a red dot, when the prepared image data is used as printing data.

Referring back to FIG. 4, a selector switch 32 is connected to the CPU 24. The selector switch 32 is used to select a special reading mode in which only the red light-emitting elements LRn are activated to irradiate the reading spots Sn with the red light beam, without the prior irradiation with the yellow light beams. In this case, the color determination solely depends upon the output signals of the comparator 31 upon irradiation of the reading spots Sn with the red light beams. In the special reading mode, the intensity of the red light beams reflected by the red spots is substantially similar than that of the red light beams reflected by the white spots (non-imaged area of the original Y), and therefore the red spots are judged to be white. Accordingly, only the black spots are judged as the colored or imaged spots. In other words, the red spots will not be printed if printing is effected according to the image data produced by the instant reading apparatus when placed in the special reading mode. Hence, the special reading mode is used when it is desired to ignore or omit, for example, corrections made in red on the original Y.

While the presently preferred embodiment has been described above with a certain degree of particularity, the above-described omission of the red beam irradiation under the specific condition as illustrated in FIG. 6, and the light-intensity adjusting routine as illustrated in FIG. 7 may be applied to other types of optical image reading apparatus, which include, for example:

a) an apparatus wherein a reading head having a relatively small number of reading portions is moved over the entire length of a reading line to be read;

b) an apparatus wherein an reading head having a large number of reading portions aligned with the predetermined reading spots along the entire length of the reading line reads the reading spots without moving relative to the original;

c) an apparatus adapted to read three colors of the images, i.e., red, green and black colors by using red, green and yellow light beams, rather than reading red and black colors as in the illustrated embodiment;

d) an apparatus as shown in FIG. 1 of Publication No. 63-11833 of Japanese examined patent application No. 53-23460, which uses a light source 3, optical lenses 4, 5, color filter 8, and red, blue and green photoelectric converters 9, 10, 11;

e) an apparatus as shown in FIGS. 5-7 of the above-identified publication, which uses light emitting diodes 23, 24, and a single photoelectric converter array (photo diode array) 29, 30, 31;

f) an apparatus wherein a reflector mirror is used, in place of light-emitting optical fibers, for transmitting light beams from light-transmitting elements to irradiate reading spots;

g) an apparatus wherein lenses are used in place of light-receiving optical fibers;

h) an apparatus wherein an amplification constant of detecting means (which includes amplifier means and comparator means connected to the light-sensitive elements) is controlled to avoid the above-indicated inconvenience associated with reading gray spots, rather than controlling the intensity of the light beams;

i) an apparatus wherein the reference or threshold value applied to the comparator 31 is controlled to avoid the above inconvenience, rather than controlling the intensity of the light beams;

j) an apparatus wherein an A/D converter is used in place of the comparator 31; and k) an apparatus wherein a buzzer or LED indicator is used in place of the display 27.

In the apparatus indicated above at h), the amplification constant of amplifiers connected to the red light-sensitive elements (PRn) is set lower than that of amplifiers connected to the yellow light-sensitive elements (PYn), for example. Where amplifiers whose amplification constant is variable are used, an amplification adjusting routine similar to the light-intensity adjusting routine of FIG. 7 may be performed prior to starting an image reading operation. In this case, the register N is used to sequentially designate the amplifiers while the register M is used to sequentially retrieve different amplification constant values from the ROM 25. In a step corresponding to step S23 of FIG. 7, the amplification constant of the amplifiers of the red light-sensitive elements PRn is set lower than the optimum values stored in the RAM 27 in a step corresponding to step S16 of FIG. 7.

Figure 8:
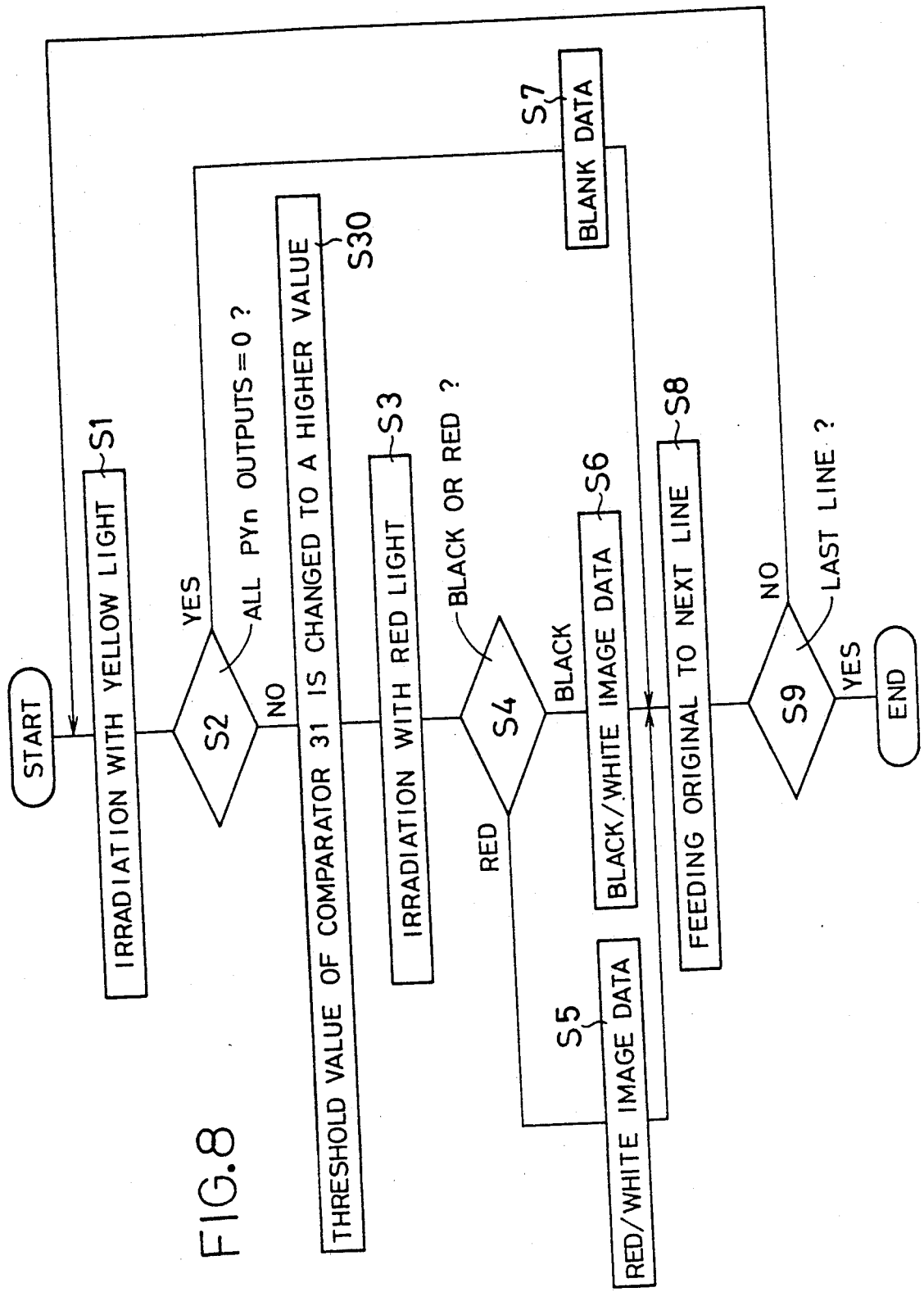
FIG. 8 is a flow chart illustrating an image reading operation in another embodiment of the invention.

In the apparatus indicated above at i), the threshold or reference value applied to the comparator 31 is increased to a suitable higher value after the irradiation with the yellow light beams and prior to the irradiation with the red light beams, as indicated at S30 in FIG. 8. This step S30 is implemented between steps S2 and S3.

Figure 9:
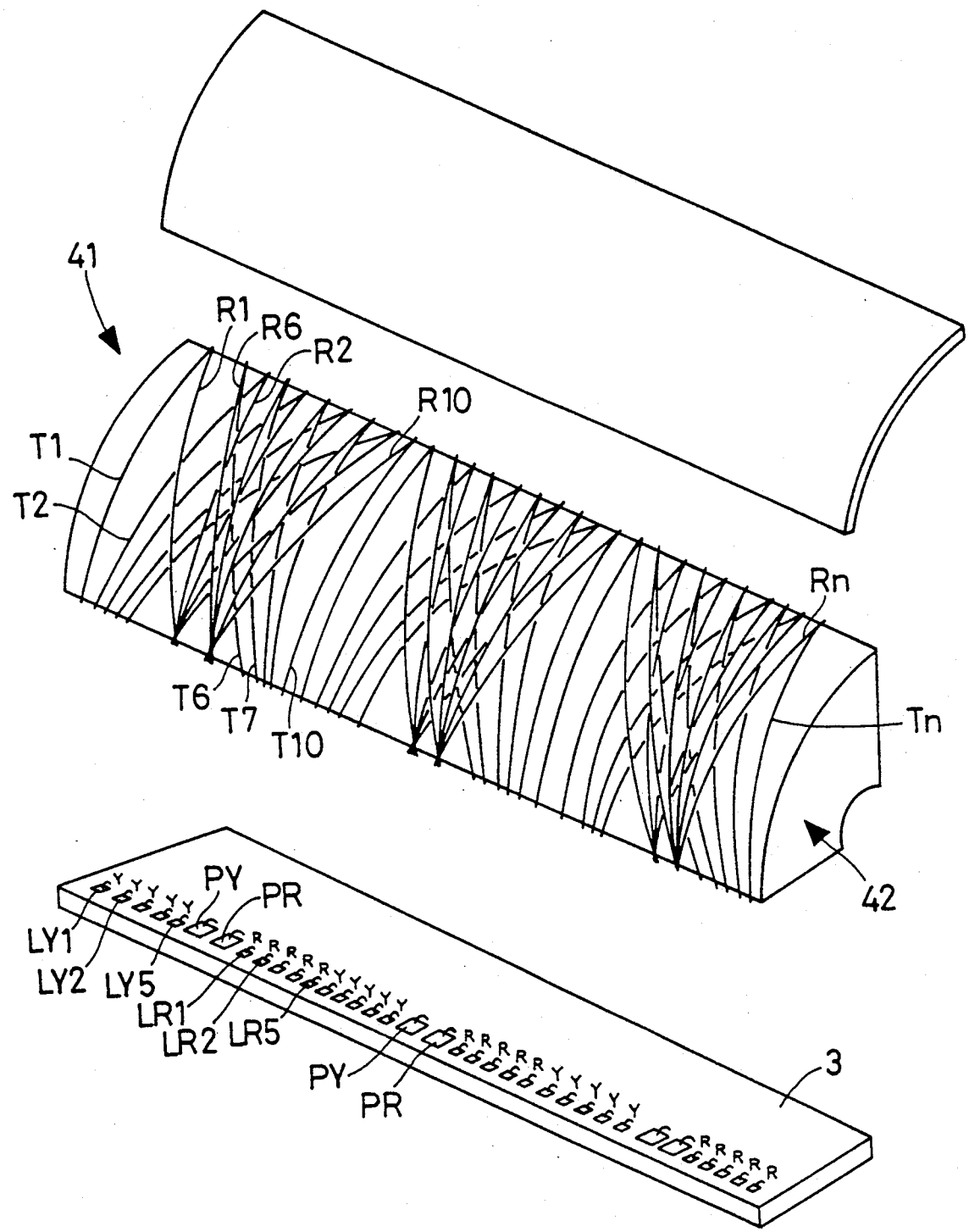
FIG. 9 is an exploded perspective view corresponding to FIG. 2, showing a further embodiment of the present invention.
Figure 10:
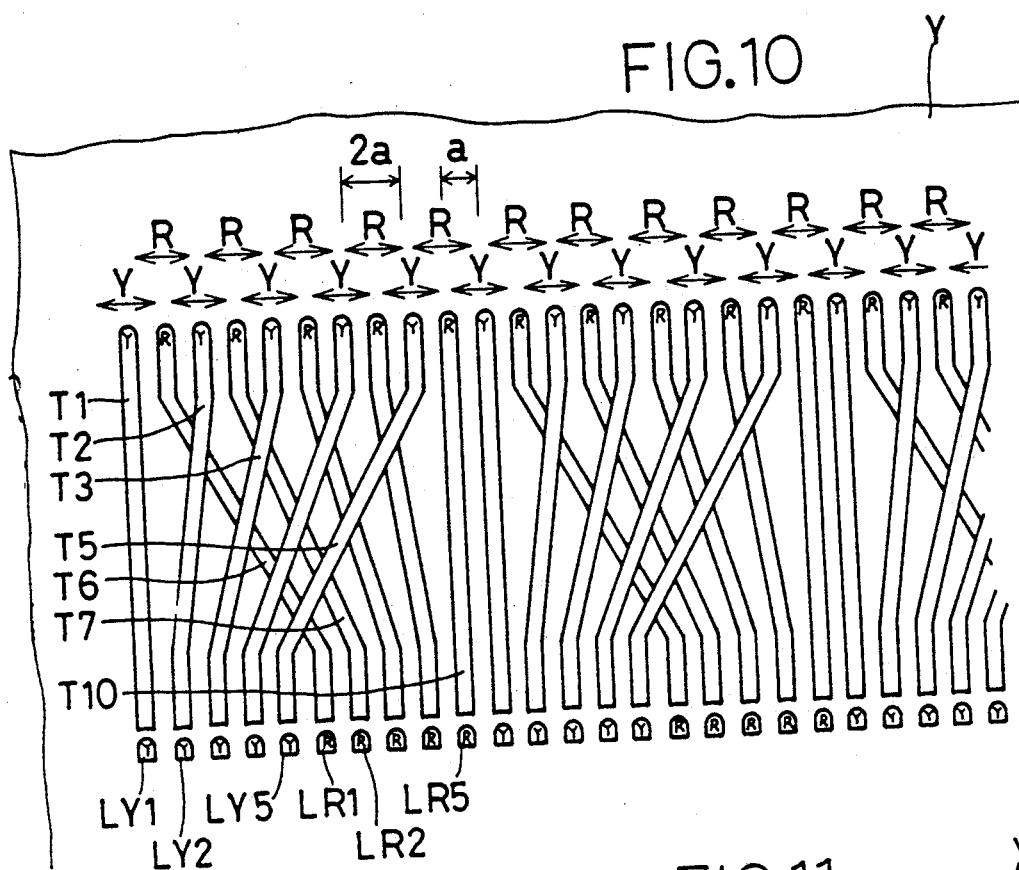
FIG. 10 is a view explaining an operation of the reading head of the apparatus of FIG. 9.

Referring next to FIGS. 9 and 10, there is illustrated an optical reading head 41 of another embodiment of the present invention. This reading head 41 is different from the reading head 3 of the preceding embodiment, in the arrangement of the optical fibers and the light-emitting and light-sensitive elements. Described more specifically, the reading head 41 has a quadrantal support body 42 which supports a plurality of groups of light-transmitting optical fibers Tn, each group consisting of ten fibers T1-T10, which in turn consists of two sets each consisting of five fibers T1-T5, T6-T10. The lower ends (as seen in FIGS. 9 and 10) of the first set of five light-transmitting optical fibers T1-T5 of the first group are optically coupled to respective five yellow light-emitting elements LY1, LY2 ... LY5 (photo transistors) which emit yellow light beams having a wavelength corresponding to a yellow color (Y). These yellow light-emitting elements LY1-LY5 are disposed successively along a straight line on a printed circuit board 43. Similarly, the lower ends of the second set of five light-transmitting optical fibers T6-T10 of the first group are optically coupled to respective five red light-emitting elements LR1, LR2 ... LR5 (photo transistors) which emit red light beams having a wavelength corresponding to a red color (R). These red light-emitting elements LR1-LR5 are disposed successively along a straight line on the printed circuit board 43, to the right of the succession of the five yellow light-emitting elements LY1-LY5. The upper or light-emitting ends of the yellow light-transmitting optical fibers T1-T5 are disposed at the reading end of the quadrantal support body 42 of the reading head 41, such that the upper ends of the optical fibers T1-T5 are equally spaced apart from each other along a straight line parallel to the line of the light-emitting elements LY1-LY5, LR1-LR5. The light-emitting ends of the red light-transmitting optical fibers R1-R5 are also equally spaced apart from each other such that the light-emitting ends of the yellow and red light-transmitting optical fibers T1-T5 and T6-T10 are disposed alternately in equally spaced-apart relationship with each other, as indicated in FIG. 10, so that the yellow and red light beams emitted from the upper or light-emitting ends of the optical fibers T1-T5 and T6-T10 will not interfere with each other.

The support body 42 further supports a plurality of groups of light-receiving optical fibers Rn, each group consisting of ten fibers R1-R10, which in turn consists of two sets each consisting of five fibers R1-R5, R6-R10. The lower ends of the first set of five light-receiving optical fibers R1-R5 are all optically coupled to a light-sensitive element PY, while the lower ends of the second set of five light-receiving optical fibers R6-R10 are all optically coupled to a light-sensitive element PR. The light-sensitive element PY is a photo diode having an excellent optical sensitivity to the yellow light beams, while the light-sensitive element PR is a photo diode having an excellent optical sensitivity to the red light beams.

As in the preceding embodiment, the light-emitting elements LYn and LRn are sequentially activated in response to the timing signals generated by the photoelectric sensor 22 (FIG. 1). More specifically described with respect to the first group of ten light-transmitting optical fibers T1-T10, the light-emitting elements LY1 and LR1 are initially activated to emit the yellow and red light beams from the light-transmitting optical fibers T1 and T6, and then the elements LY2 and LR2 are activated to emit the yellow and red light beams from the light-transmitting optical fibers T2 and T7. Finally, the elements LY5 and LR10 are activated to emit the yellow and red light beams from the light-transmitting optical fibers T5 and T10. As a result, all the reading spots on the original Y are irradiated with both the yellow light beam and the red light beam, at different times while the reading head 41 is moved in one direction. The yellow and red light beams reflected by each reading spot are received by the respective yellow and red light-sensitive elements PY and PR, so that the color of the reading spot is determined by processing the output signals from the light-sensitive elements PY and PR, as described above with respect to the first embodiment.

In the optical reading head 41 of the present apparatus, the light-transmitting optical fibers T1-T10 are optically coupled to the respective light-emitting elements LYn, LRn, and the five yellow light-receiving optical fibers R1-R5 are optically coupled to the single yellow light-sensitive element PY while the five red light-receiving optical fibers R6-R10 are optically coupled to the single red light-sensitive element PR. However, the above arrangement may be reversed. Namely, it is possible for example that the first five light-transmitting optical fibers T1-T5 and the remaining five light-transmitting optical fibers T6-T10 are optically coupled to the two respective light-emitting elements, and the light-receiving optical fibers R1-R10 are optically coupled to the respective ten light-sensitive elements PY, PR. In this case, light beams are simultaneously emitted from the ten light-transmitting optical fibers T1-T10, and the reflected light beams are simultaneously received by the ten light-sensitive elements PY, PR, whereby the color determination of the reading spots can be effected at a considerably increased speed.

Figure 11:
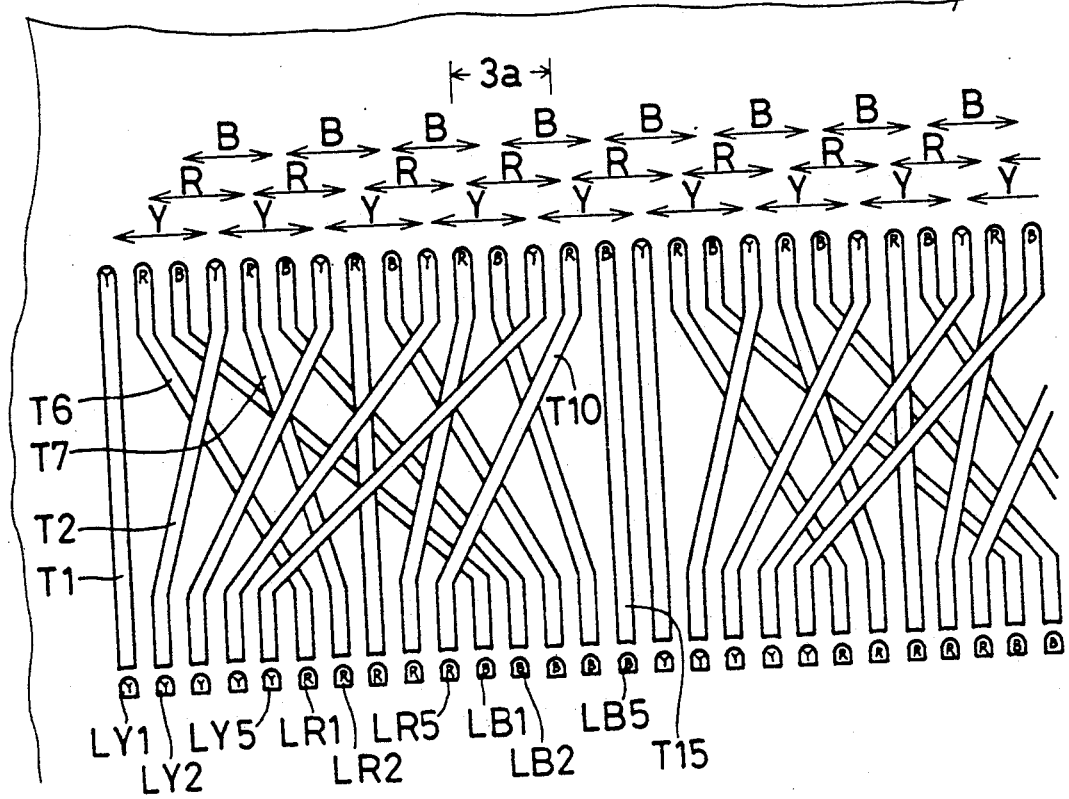
FIG. 11 is a view explaining an operation of the reading head of a still further embodiment of the optical reading apparatus of the invention.

Referring to FIG. 11, there is illustrated a further modified embodiment of the invention wherein the reading head is adapted to irradiate the reading spots with three kinds of light beams which correspond to yellow (Y), red (R) and blue (B). The reading head has a plurality of groups of light-transmitting optical fibers Tn, each group consisting of fifteen fibers. For example, the first group consists of five yellow fibers T1-T5 optically coupled to respective five yellow light-emitting elements LY1-LY5, five red fibers T6-T10 optically coupled to respective five red light-emitting elements LR1-LR5, and five blue fibers T11-T15 optically coupled to respective five blue light-emitting elements LB1-LB5. The upper or light-emitting ends of the light-transmitting optical fibers T1-T15 are positioned such that the end of the optical fiber coupled to the red light-emitting element LRn is disposed between the ends of the two optial fibers coupled to the yellow and blue light-emitting elements LYn and LBn, as shown in FIG. 11. The reading head according to this arrangement permit a multi-color or substantially full-color image reading operation. In the instant arrangement, the reading head is adapted to move by a distance (=3a) which is three times a distance "a" between the reading ends of the adjacent light-transmitting optical fibers Tn.

Figure 12:
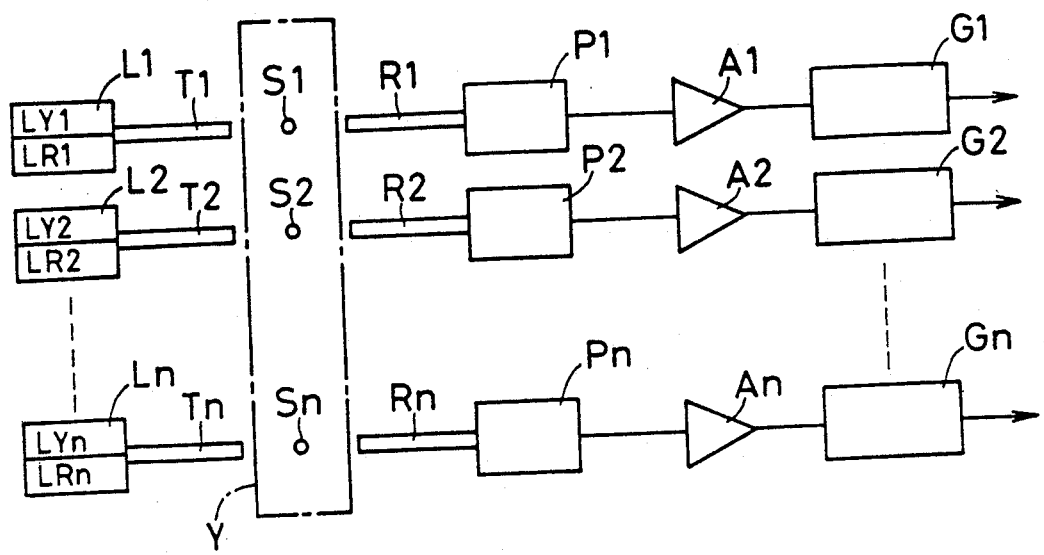
FIG. 12 is a schematic block diagram showing an electric control system for the reading head of a known image reading apparatus.
Figure 13:
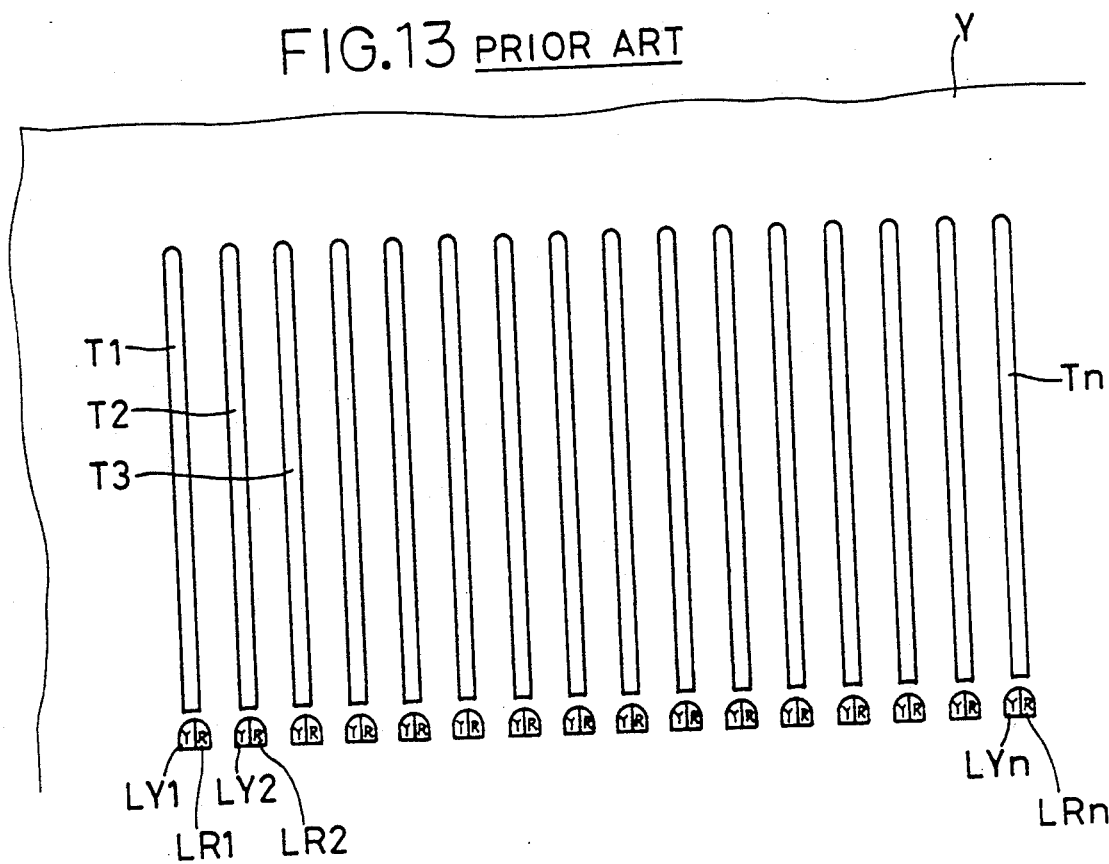
FIG. 13 is a view illustrating an arrangement of the reading head of the known apparatus of FIG. 12.

The arrangements of the reading heads 13, 41 which have been described above are advantageous over a known arrangement as shown in FIGS. 12 and 13 which is capable of determinating two colors such as black and red other than the white base color of an original that bears images. Described in detail, the known reading head of FIGS. 12 and 13 has a multiplicity of light-transmitting optical fibers Tn, and a corresponding number of light-receiving optical fibers Rn. Each of the light-transmitting optical fibers Tn is optically coupled to two light-emitting elements LYn and LRn in the form of light-emitting diodes (LED). The light-emitting element LYn is adapted to emit a light beam having a wavelength which corresponds to a yellow color, and the light-emitting element LRn is adapted to emit a light beam having a wavelength which corresponds to a red color. Initially, the yellow light-emitting element LYn is activated to irradiate each reading spot Sn on an original Y, with the yellow light beam emitted from the appropriate light-transmitting optical fiber Tn. The yellow light beam reflected by the reading spot Sn is received by a corresponding light-sensitive element Pn through the corresponding light-receiving optical fiber Rn. The light-sensitive element Pn generates an output signal indicative of the intensity of the reflected light beam, and the output signal is amplified by a corresponding amplifier An. The amplified signal is applied to a corresponding color discriminating element Gn which compares the received signal with a predetermined threshold value, to determine whether there exists an image (black or red color) in the appropriate reading spot Sn.

Subsequently, the red light-emitting element LRn is activated to irradiate the reading spot Sn with the red light beam emitted from the corresponding light-transmitting optical fiber Tn. The corresponding light-sensitive element Pn generates an output signal indicative of the intensity of the reflected red light beam, and the output signal is applied to the corresponding color discriminating element Gn via the amplifier An. The element Gn compares the received signal with a threshold value for the red color. Based on the results of comparison of the received signals with the respective threshold values, the color discriminating element Gn determines the color in each reading spot Sn. Namely, the element Gn determines that the reading spot Sn is black if the levels of both of the received signals upon activation of the yellow and red light-emitting elements LYn and LRn are lower than the respective threshold levels. If the levels of the two received signals are both higher than the threshold levels, the element Gn determines that the color of the reading spot is white. If the level of one of the two signals is lower than the corresponding threshold level and that of the other signal is higher than the corresponding threshold level, then the element Gn determines that the color of the reading spot Sn is red.

In the above-described known arrangement, however, the amount of the light beam incident upon the end of the light-transmitting optical fiber Tn is a half of the amount of the light beam which is emitted by the light-emitting element LYn or LRn, since the two halves of the cross sectional area at the end of the optical fiber Tn are aligned with the respective two light-emitting elements LYn and LRn. Consequently, the amount of the reflected light beam received by the light-sensitive element Pn is not sufficient to assure reliable determination of the color of the reading spot Sn by the color discriminating element Gn. Further, the positioning of each light-transmitting optical fiber Tn in alignment with the two light-emitting elements LYn, LRn is considerably difficult, and leads to increasing the cost of manufacture of the reading head.

The reading heads 13, 41 used in the illustrated embodiments do not suffer from the drawbacks indicated above, since the light-transmitting optical fibers are optically coupled to the respective light-emitting optical fibers.

While the present invention has been described in its presently preferred embodiments, it is to be understood that the invention is not limited to the precise details of the illustrated embodiments, but may be embodied with various changes, modifications and improvements, which may occur to those skilled in the art, without departing from the spirit and scope of the invention defined in the following claims.

What is claimed is:

1. An optical image reading apparatus for photoelectrically reading images formed in at least two colors on a surface of an original having a base color different from said at least two colors, comprising:

first reading means for obtaining a first image signal for each of a multiplicity of reading spots in a predetermined area on said original, said first image signal having two different levels one of which corresponds to said base color and the other of which corresponds to said at least two colors;

second reading means for obtaining a second image signal for said each reading spot, said second image signal cooperating with said first image signal to discriminate each of said at least two colors from the other of said at least two ,colors; and determining means for determining whether the levels of said first image signals for all of said multiplicity of reading spots are equal to said one level corresponding to said base color, or not, and if so, inhibiting said second reading means from operating to obtain said second image signal for said each reading spot.

2. An optical image reading apparatus for photoelectrically reading images formed in at least two colors on a surface of an original having a base color different from said at least two colors, comprising:

first light source means for emitting first light beams having a first wavelength for distinguishing said at least two colors of said images from said base color;

second light source means for emitting second light beams having at least one second wavelength different from said first wavelength;

image-reading irradiation means for irradiating predetermined reading spots in a predetermined area of said surface of the original with said first and second light beams, at different times, for reading the images in said predetermined area;

photoelectric detecting means for generating output signals indicative of optical intensities of said first and second light beams which have been optically influenced by the colors in said reading spots;

color discriminating means for determining the colors of the images in said reading spots, based on said output signals from said photoelectric detecting means; and irradiation omitting means for determining, based on said output signals indicative of said optical intensities of the optically influenced first light beams, whether said color discriminating means has recognized an absence of any colors other than said base color in said predetermined area, and inhibiting said second light source means from emitting said second light beams, if said irradiation omitting means determines that said color discriminating means has recognized said absence.

3. An optical image reading apparatus according to claim 2, wherein at least one of an intensity of said second light beams and an amplification constant of said photoelectric detecting means with respect to the output signals indicative of said optical intensity of said optically influenced second light beams is smaller than corresponding at least one of an intensity of said first light beams and an amplification constant of said photoelectric detecting means with respect to the output signals indicative of said optical intensities of said optically influenced first light beams.

4. An optical image reading apparatus according to claim 3, further comprising:

a light reflecting surface having a reference reflectance of light;

preliminary irradiation means for irradiating test spots on said light reflecting surface with said first and second light beams, at different times;

adjusting means for adjusting the intensities of said first and second light beams emitted by said first and second light source means, and/or the amplification constants of said photoelectric detecting means, so that a level of the output signals of said detecting means for said first and second light beams is equal to a predetermined level while said preliminary irradiation means is operating;

memory means for storing the adjusted intensity of said optically influenced first and second light beams, and/or the adjusted amplification constants; and sensitivity lowering means for setting the amount of said second light beams emitted by said second light source means, and/or the amplification constant of said photoelectric detecting means for said optically influenced second light beams, at a value lower than that stored in said memory means, whereby said at least one of the intensity of said optically influenced second light beams and said amplification constant of said photoelectric detecting means with respect to the output signals indicative of said optical intensities of said optically influenced second light beams is smaller than the corresponding at least one of the amount of said first light beams and said amplification constant of said photoelectric detecting means with respect to the output signals indicative of said optical intensities of said optically influenced first light beams.

5. An optical image reading apparatus according to claim 3, wherein said first light source means emits yellow light beams as said first light beams, while said second light source means emits red light beams as said second light beams.

6. An optical image reading apparatus according to claim 2, wherein said photoelectric detecting means comprises:

light-sensitive elements for receiving said optically influenced first and second light beams, and generating optical intensity signals corresponding to the intensities of said optically influenced first and second light beams;

comparator means for comparing levels of said optical intensity signals from said light-sensitive elements with a threshold level of a reference signal, and producing as said output signals of said photoelectric detecting means signals having two different levels, depending upon whether the levels of said optical intensity signals are higher than said threshold level, or not; and threshold adjusting means for changing said threshold level of said reference signal while said second light source means is operating, from that while said first light source means is operating.

7. An optical image reading apparatus according to claim 2, further comprising selector means for activating said second light source to emit said second light beams having a selected one of said at least one second wavelength, without activating said first light source.

8. An optical image reading apparatus according to claim 2, wherein said image-reading irradiation means comprises:

a platen for supporting said original;

a reading head having a plurality of first light emitting portions optically coupled to said first light source means, and a plurality of second light emitting portions optically coupled to said second light source means, said first and second light emitting portions being disposed alternately such that said reading spots irradiated by said first and second light beams are arranged along a straight line, and such that said first light emitting portions are spaced apart from each other by a predetermined first distance while said second light emitting portions are spaced apart from each other by said predetermined first distance, a pitch at which said reading spots are arranged being smaller than said predetermined distance;

a head feeding device for moving said reading head along said straight line, in increments of a predetermined second distance corresponding to said pitch; and light source control means for activating said first and second light source means upon each incremental movement of said reading head by said predetermined second distance.

9. An optical image reading apparatus according to claim 2, wherein said first light source means includes a plurality of first light emitting elements for generating said first light beams, and a plurality of first light-transmitting optical fibers optically coupled to said first light-emitting elements, respectively, for transmitting said first light beams, and said second light source means includes a plurality of second light-emitting elements for generating said second light beams, and a plurality of second light-transmitting optical fibers optically coupled to said second light-emitting elements, respectively, for transmitting said second light beams, ends of said first optical fibers remote from said first light-emitting elements being spaced apart from each other by a predetermined distance along a straight line, while ends of said second optical fibers being disposed between said ends of the adjacent first optical fibers such that said second light beams emitted from said ends of said second optical fibers do not interfere with said first light beams emitted from said ends of said first optical fibers.

10. An optical image reading apparatus, for photoelectrically reading images in at least two colors on a surface of an original having a base color different from said at least two colors, comprising:
a plurality of groups of light-emitting elements which generate respective radiations of different color corresponding to said at least two colors;
a plurality of groups of light-sensitive elements which receive said respective radiations which are emitted from said light-emitting elements toward said original and which are optically influenced by said images;
detecting means for detecting outputs of said light-sensitive elements;
a reflecting surface having a reference reflectance of light;
preliminary positioning means for aligning said light-emitting and light-sensitive elements and said reflecting surface with each other;
adjusting means for activating said groups of light-emitting elements after said light-emitting and light-sensitive elements and said reflecting surface are aligned with each other, and adjusting at least one of an intensity of the respective radiations generated by said light-emitting elements and an amplification constant of said detecting means with respect to said respective radiations, so that a level of output signals of said detecting means coincides with a reference valve;
memory means for storing the adjusted intensity of the radiations and/or the adjusted amplification constant of said detecting means;
first judging means for controlling one of said groups of light-emitting elements so as to establish said adjusted intensity, and/or said detecting means so as to establish said adjusted amplification constant, and effecting determination as to the presence and absence of said images on said recording medium, depending upon said output signals from said detecting means; and
second judging means for controlling the other of said groups of light-emitting elements so as to change at least one of said intensity of the radiations emitted by said other of said groups of light-emitting elements and said amplification constant of said detecting means, to a value lower than that stored in said memory means, and for effecting discrimination of said at least two colors from each other, depending upon said outputs signals from said detecting means and a result of the determination by said first judging means, and means responsive to detection of said value lower than that stored in said memory for preventing determination of an intermediate color between said base color and one of said at least two colors, as being another of said at least two colors, in a situation where determination of said intermediate color as being said one of said at least two colors is acceptable while the determination of said intermediate color as being said another color of said at least two colors is unacceptable.

11. An optical image reading apparatus for photoelectrically reading images formed in at least two colors on a surface of an original having a base color different from said at least two colors, comprising:
first reading means for obtaining a first image signal for each of a multiplicity of reading spots in a predetermined area on said original, said first image signal having two different levels, one of which corresponds to said base color and the other of which corresponds to said at least two colors;
second reading means for obtaining a second image signal for said each reading spot, said second image signal cooperating with said first image signal to discriminate each of said at least two colors from the other of said at least two colors,
said second reading means having a lower optical sensitivity than said first reading means, and
means to prevent determination of an intermediate color between said base color and one of said at least two colors, as being another of said at least two colors, in a situation where determination of said intermediate color as being said one of said at least two colors is acceptable while the determination of said intermediate color as being said another of said at least two colors is unacceptable;
wherein said first reading means comprises first light source means for emitting first light beams which irradiate said reading spots and which are optically influenced by the colors in said reading spots, and said second reading means comprises second light source means for emitting second light beams which irradiate said reading spots and which are optically influenced by said colors, said first and second reading means comprising photoelectric detecting means for generating said first and second image signals indicative of optical intensities of said first and second light beams which have been optically influenced by said colors in said reading spots, said apparatus further comprising
a light reflecting surface having a reference reflectance of light;
preliminary irradiation means for irradiating test spots on said light reflecting surface with said first and second light beams, at different times;
adjusting means for adjusting the intensities of said first and second light beams emitted by said first and second light source means, so that a level of said first and second image signals of said photoelectric detecting means is equal to a predetermined level while said preliminary irradiation means is operating;
memory means for storing the adjusted intensity of said optically influenced first and second light beams; and sensitivity lowering means for setting the intensity of said second light beams at a value lower that said adjusted intensity stored in said memory means, whereby said second reading means is given a lower optical sensitivity than said first reading means.

12. An optical image reading apparatus for photoelectrically reading images formed in at least two colors on a surface of an original having a base color different from said at least two colors, comprising:
first reading means for obtaining a first image signal for each of a multiplicity of reading spots in a predetermined area on said original, said first image signal having two different levels, one of which corresponds to said base color and the other of which corresponds to said at least two colors;
second reading means for obtaining a second image signal for said each reading spot, said second image signal cooperating with said first image signal to discriminate each of said at least two colors from the other of said at least two colors,
said second reading means having a lower optical sensitivity than said first reading means, and
means to prevent determination of an intermediate color between said base color and one of said at least two colors, as being another of said at least two colors, in a situation where determination of said intermediate color as being said one of said at least two colors is acceptable while the determination of said intermediate color as being said another of said at least two colors is unacceptable;
wherein said first reading means comprises first light source means for emitting first light beams which irradiate said reading spots and which are optically influenced by the colors in said reading spots, and said second reading means comprises second light source means for emitting second light beams which irradiate said reading spots and which are optically influenced by said colors, said first and second reading means comprising photoelectric detecting means for generating said first and second image signals indicative of optical intensities of said first and second light beams which have been optically influenced by said colors in said reading spots, said apparatus further comprising:
a light reflecting surface having a reference reflectance of light;
preliminary irradiation means for irradiating test spots on said light reflecting surface with said first and second light beams, at different times;
adjusting means for adjusting the amplification constants of said photoelectric detecting means for said first and second light beams emitted by said first and second light source means, so that a level of said first and second image signals of said photoelectric detecting means is equal to a predetermined level while said preliminary irradiation means is operating;
memory means for storing the adjusted amplification constant of said phtoelectric detecting means; and
sensitivity lowering means for setting the amplification constant of said photoelectric detecting means for said optically influenced second light beams at a value lower than said adjusted amplification constant stored in said memory means, whereby said second reading means is given a lower optical sensitivity than said first reading means.

13. An optical image reading apparatus for photoelectrically reading images formed in at least two colors on a surface of an original having a base color different from said at least two colors, comprising:
first reading means for obtaining a first image signal for each of a multiplicity of reading spots in a predetermined area on said original, said first image signal having two different levels, one of which corresponds to said base color and the other of which corresponds to said at least two colors;
second reading means for obtaining a second image signal for said reach reading spot, said second image signal cooperating with said first image signal to discriminate each of said at least two colors from the other of said at least two colors,
said second reading means having a lower optical sensitivity than said first reading means,
means to prevent determination of an intermediate color between said base color and one of said at least two colors, as being another of said at least two colors, in a situation where determination of said intermediate color as being said one of said at least two colors is acceptable while the determination of said intermediate color as being said another of said at least two colors is unacceptable;
wherein said first reading means comprises first light source means for emitting first light beams which irradiate said reading spots and which are optically influenced by the colors in said reading spots, and said second reading means comprises second light source means for emitting second light beams which irradiate said reading spots and which are optically influenced by said colors, said first and second reading means comprising photoelectric detecting means for generating said first and second image signals indicative of optical intensities of said first and second light beams which have been optically influenced by said colors in said reading spots, said photoelectric detecting means comprising:
light-sensitive elements for receiving said optically influenced first and second light beams, and generating optical intensity signals corresponding to the intensities of said optically influenced first and second light beams;
comparator means for comparing levels of said optical intensity signals from said light-sensitive elements with a threshold level, and for producing said first and second image signals, each having two different levels, depending upon whether the levels of said optical intensity signals are higher than said threshold level, or not; and
threshold adjusting means for changing said threshold level of said reference signal while said second light source means is operating, from that while said first light source means is operating, whereby said second reading means is given said lower optical sensitivity than said first reading means.

14. An optical image reading apparatus according to claim 10, wherein said adjusting means comprises a memory means for storing intensity data consisting of a plurality of different intensity values which change in steps, means for sequentially selecting said different intensity values, means for applying a drive signal corresponding to each of the selected intensity values to each of said light-emitting elements aligned with said reflecting surface, and means for comparing the level of the output signal of said each light-emitting element with reference value when said each light-emitting element is activated with said drive signal, said memory means storing one of said different intensity values at which the level of said output signal is equal to or larger than said reference value, and wherein said first judging means determines the intensity value stored in said memory means as an optimum intensity of each of the light-emitting elements of one of said plurality of groups, while said second judging means determines one of said intensity values which is lower than said optimism intensity of said one group of light-emitting elements, as an optimum intensity of the other of said groups of light-emitting elements.

15. An optical image reading apparatus according to claim 10, wherein said adjusting means comprises a memory means for storing amplification data consisting of a plurality of different amplification constants of said detecting means with respect to said respective radiations, said different amplification constants changing in steps, said adjusting means further comprising means for sequentially selecting said different amplification constants, means for applying an amplification signal corresponding to each of the selected amplification constants to said detecting means when each of said light-emitting elements is activated while being aligned with said reflecting surface, and means for comparing the level of the output signal of said each light-emitting element with said reference value when said each light-emitting element is activated with said amplification signal applied to said detecting means, said memory means storing one of said different amplification constants at which the level of said output signal is equal to or larger than said reference value, and wherein said first judging means determines the amplification constant stored in said memory means as an optimum amplification constant of each of the light-emitting elements of one of said plurality of groups, while said second judging means determines one of said amplification constants which is lower than said optimum amplification constant of said one group of light-emitting elements, as an optimum amplification constant of the other of said groups of light-emitting elements.

16. An optical image reading apparatus for photoelectrically reading images formed in at least two colors on a surface of an original having a base color different from said at least two colors, comprising:

first light source means for emitting first light beams having a first wavelength for distinguishing said at least two colors of said images from said base color;

second light source means for emitting second light beams having at least one second wavelength different from said first wavelength;

image-reading irradiation means for irradiating predetermined reading spots in a predetermined area of said surface of the original with said first and second light beams, at different times, for reading the images in said predetermined area;

photoelectric detecting means for generating output signals indicative of optical intensities of said first and second light beams which have been optically influenced by the colors in said reading spots;

color discriminating means for determining the colors of the images in said reading spots, based on said output signals from said photoelectric detecting means; and selector means for establishing a special reading mode in which only said second light source means is activated to emit said second light beams having a selected one of said at least one second wavelength, without prior activation of said first light source means, whereby one of said at least two colors is read as said base color and therefore the images in said one color are ignored.

* * * * *

UNITED STATES PATENT AND TRADEMARK OFFICE
CERTIFICATE OF CORRECTION

PATENT NO. : 5,021,877
DATED : June 4, 1991
INVENTOR(S) : Michio TSUCHIYA et al.

It is certified that error appears in the above-identified patent and that said Letters Patent is hereby corrected as shown below:

ON THE TITLE PAGE:

Item [73]   change the Assignee from "Brother Kogyo Kabushiki Kaisha and Nippon Telegraph Corporation" to --Brother Kogyo Kabushiki Kaisha and Nippon Telegraph & Telephone Corporation--.

Signed and Sealed this

Fourth Day of May, 1993

Attest:

MICHAEL K. KIRK

Attesting Officer

Acting Commissioner of Patents and Trademarks